United States Patent
Lee et al.

(10) Patent No.: US 9,961,628 B2
(45) Date of Patent: May 1, 2018

(54) SCAN CHANNEL REDUCTION TO IMPROVE WI-FI SYSTEM POWER

(71) Applicant: QUALCOMM Incorporated, San Diego, CA (US)

(72) Inventors: Jin Won Lee, San Diego, CA (US); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 14/619,675

(22) Filed: Feb. 11, 2015

(65) Prior Publication Data

US 2016/0183181 A1    Jun. 23, 2016

Related U.S. Application Data

(60) Provisional application No. 62/093,948, filed on Dec. 18, 2014.

(51) Int. Cl.
| | |
|---|---|
| H04W 48/20 | (2009.01) |
| H04B 17/26 | (2015.01) |
| H04B 17/318 | (2015.01) |
| H04W 48/16 | (2009.01) |
| H04W 36/00 | (2009.01) |

(52) U.S. Cl.
CPC ............ *H04W 48/20* (2013.01); *H04B 17/26* (2015.01); *H04B 17/318* (2015.01); *H04W 36/0083* (2013.01); *H04W 48/16* (2013.01)

(58) Field of Classification Search
CPC .......... H04W 36/0083; H04W 48/20; H04W 48/16; H04B 17/318; H04B 17/26
See application file for complete search history.

(56) References Cited

U.S. PATENT DOCUMENTS

| | | | |
|---|---|---|---|
| 8,045,576 B2 | 10/2011 | Tsfaty et al. | |
| 8,385,988 B2 | 2/2013 | Bakthavathsalu et al. | |
| 2002/0068571 A1 | 6/2002 | Ohlsson et al. | |
| 2011/0263257 A1 | 10/2011 | Kago et al. | |
| 2013/0176869 A1* | 7/2013 | Finlow-Bates ... | H04W 52/0254 370/252 |

(Continued)

FOREIGN PATENT DOCUMENTS

| | | |
|---|---|---|
| CN | 102098764 A | 6/2011 |
| EP | 0949834 A2 | 10/1999 |

OTHER PUBLICATIONS

International Search Report and Written Opinion—PCT/US2015/062544—ISA/EPO—Apr. 8, 2016 (146209WO).

(Continued)

*Primary Examiner* — Ian N Moore
*Assistant Examiner* — Brian T Le
(74) *Attorney, Agent, or Firm* — Paradice and Li LLP/Qualcomm

(57) ABSTRACT

A system and method are disclosed that may selectively switch a station's association from a first AP to a second AP based, at least in part, on whether an indication of first RSSI values for the first AP is greater than an indication of second RSSI values for the second AP by more than a difference value. For some embodiments, the difference value may be dynamically adjusted based, at least in part, on the first RSSI values, on a connection history of the station, and/or on a user selection.

16 Claims, 7 Drawing Sheets

(56) References Cited

U.S. PATENT DOCUMENTS

2013/0217384 A1 8/2013 Snider
2014/0211763 A1* 7/2014 Choi .................... H04W 36/20
370/332

OTHER PUBLICATIONS

Kim S.K., et al., "An Adaptive Handover Decision Algorithm Based on the Estimating Mobility from Signal Strength Measurements", Vehicular Technology Conference, 2004. VTC2004-Fall. 2004 IEEE 60th, XP010786773, Sep. 26-29, 2004, vol. 2, pp. 1004-1008, DOI: 10.11 09/VETECF.2004.1400172, ISBN: 978-0/7803-8521-4.
Waters D.W., et al., "WLAN Scanning Strategies for RSSI-based Positioning," IEEE Global Communications Conference (GLOBECOM), Dec. 2013, pp. 493-497.

* cited by examiner

610⤴

> increase the difference value when a moving average of the first RSSI values indicates that the first RSSI values are increasing over time. (611)

↓

> decrease the difference value when the moving average of the first RSSI values indicates that the first RSSI values are decreasing over time. (612)

> increase the difference value when the STA has been associated with the first AP for more than a predetermined time period. (621)

↓

> decrease the difference value when the STA has been associated with the first AP for not more than the predetermined time period. (622)

> setting the difference value to a relatively high value when the user selects a first mode. (631)

↓

> setting the difference value to a relatively low value when the user selects a second mode. (632)

FIG. 6C

SCAN CHANNEL REDUCTION TO IMPROVE WI-FI SYSTEM POWER

CROSS-REFERENCE TO RELATED APPLICATION

This application claims priority to U.S. Provisional Patent Application No. 62/093,948 entitled "SCAN CHANNEL REDUCTION TO IMPROVE WI-FI SYSTEM POWER" filed Dec. 18, 2014, the entirety of which is incorporated by reference herein.

TECHNICAL FIELD

The present embodiments relate generally to wireless networks, and specifically to reducing power consumption associated with scanning for nearby wireless networks.

BACKGROUND OF RELATED ART

A wireless local area network (WLAN) may be formed by one or more access points (APs) that provide a shared wireless communication medium for use by a number of client devices or stations (STAs). Each AP, which may correspond to a Basic Service Set (BSS), periodically broadcasts beacon frames to enable any STAs within wireless range of the AP to establish and/or maintain a communication link with the WLAN. In a typical WLAN, only one STA may use the wireless medium at any given time, and each STA may be associated with only one AP at a time. Due to the increasing ubiquity of wireless networks, when a STA seeks to join a wireless network, the STA may have a choice between multiple wireless networks and/or between multiple APs (e.g., that form an extended BSS). Thus, the STA may periodically scan its surroundings to find and/or determine the most suitable AP with which to associate. For example, while the STA is associated with (e.g., connected to) one AP, the STA may scan for other nearby APs that may provide better signal quality or throughput; while the STA is not associated with any AP, the STA may scan for nearby APs with which to associate. Because scanning operations may consume a significant amount of power, it is desirable to reduce power consumption associated with scanning operations.

BRIEF DESCRIPTION OF THE DRAWINGS

The present embodiments are illustrated by way of example and are not intended to be limited by the figures of the accompanying drawings, where:

FIGS. 6A-6C show illustrative flow charts depicting example operations for dynamically adjusting the RSSI difference value, in accordance with some embodiments.

Like reference numerals refer to corresponding parts throughout the drawing figures.

DETAILED DESCRIPTION

Figure 1:
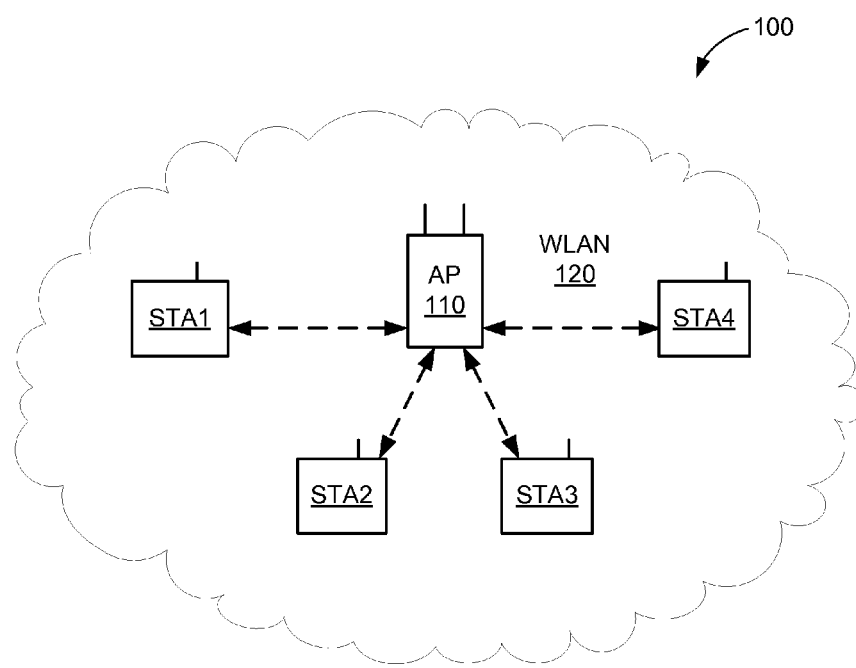
FIG. 1 shows a block diagram of an example WLAN system within which the present embodiments may be implemented.

Embodiments are described below in the context of WLAN systems for simplicity only. It is to be understood that the present embodiments are equally applicable to other wireless networks (e.g., cellular networks, pico networks, femto networks, satellite networks), as well as for systems using signals of one or more wired standards or protocols (e.g., Ethernet and/or HomePlug/PLC standards). As used herein, the terms "WLAN" and "Wi-Fi®" may include communications governed by the IEEE 802.11 family of standards, BLUETOOTH® (Bluetooth or BT), HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, although described below in terms of an infrastructure WLAN system including an AP and a plurality of STAs, the present embodiments are equally applicable to other WLAN systems including, for example, WLANs including a plurality of APs, peer-to-peer (or Independent Basic Service Set) systems, Wi-Fi Direct systems, and/or Hotspots. In addition, although described herein in terms of exchanging data packets between wireless devices, the present embodiments may be applied to the exchange of any data unit, packet, and/or frame between wireless devices. Thus, the term "data packet" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The present embodiments are not to be construed as limited to specific examples described herein but rather to include within their scopes all embodiments defined by the appended claims.

As mentioned above, a wireless station (STA) may periodically scan its surroundings to find and/or determine the most suitable AP with which to associate. Connected scans (or "roaming" scans) may refer to scanning operations performed by a STA while the STA is connected to an associated AP (e.g., to find a more suitable AP to roam to). Disconnected scans may refer to scanning operations performed by a STA that is not yet connected to any AP (e.g., to find a suitable AP to associate with). Because scanning operations may consume a significant amount of power, it is desirable to reduce power consumption associated with scanning operations.

In accordance with the example embodiments, power consumption associated with a STA's scanning operations may be reduced by reducing the number of channels that the STA scans. For example, rather than scanning all available channels in a given frequency band (e.g., all channels in the 2.4 GHz band), the STA may scan only a subset of the available channels (e.g., channels 1 and 6 in the 2.4 GHz band), which reduces power consumption (as compared with a full channel scan). For at least some embodiments, the STA may scan only the most popular or frequently used channels, may terminate the scanning operation if an RSSI value of an AP is greater than a threshold value, and may dynamically adjust the threshold value based, at least in part, on the number of channels scanned. For at least one embodiment, the threshold value may be initially set to a relatively high value (e.g., a threshold to ensure that the AP having the highest RSSI value is located), and then the threshold value may be progressively decreased towards a relatively low value (e.g., a threshold value that precludes a number of channels being scanned before locating a suitable AP).

FIG. 1 is a block diagram of a wireless network system 100 within which example embodiments may be implemented. The system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. The AP 110 is assigned a unique MAC address that is programmed therein by, for example, the manufacturer of the access point. Similarly, each of STA1-STA4 is also assigned a unique MAC address.

The stations STA1-STA4 may be any suitable Wi-Fi enabled wireless devices including, for example, cell phones, personal digital assistants (PDAs), tablet devices, laptop computers, or the like. The stations STA1-STA4 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, stations STA1-STA4 may include a transceiver, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 5 and 6A-6C.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least one embodiment, AP 110 may include a transceiver, a network interface, one or more processing resources, and one or more memory sources. The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 5 and 6A-6C.

Figure 2:
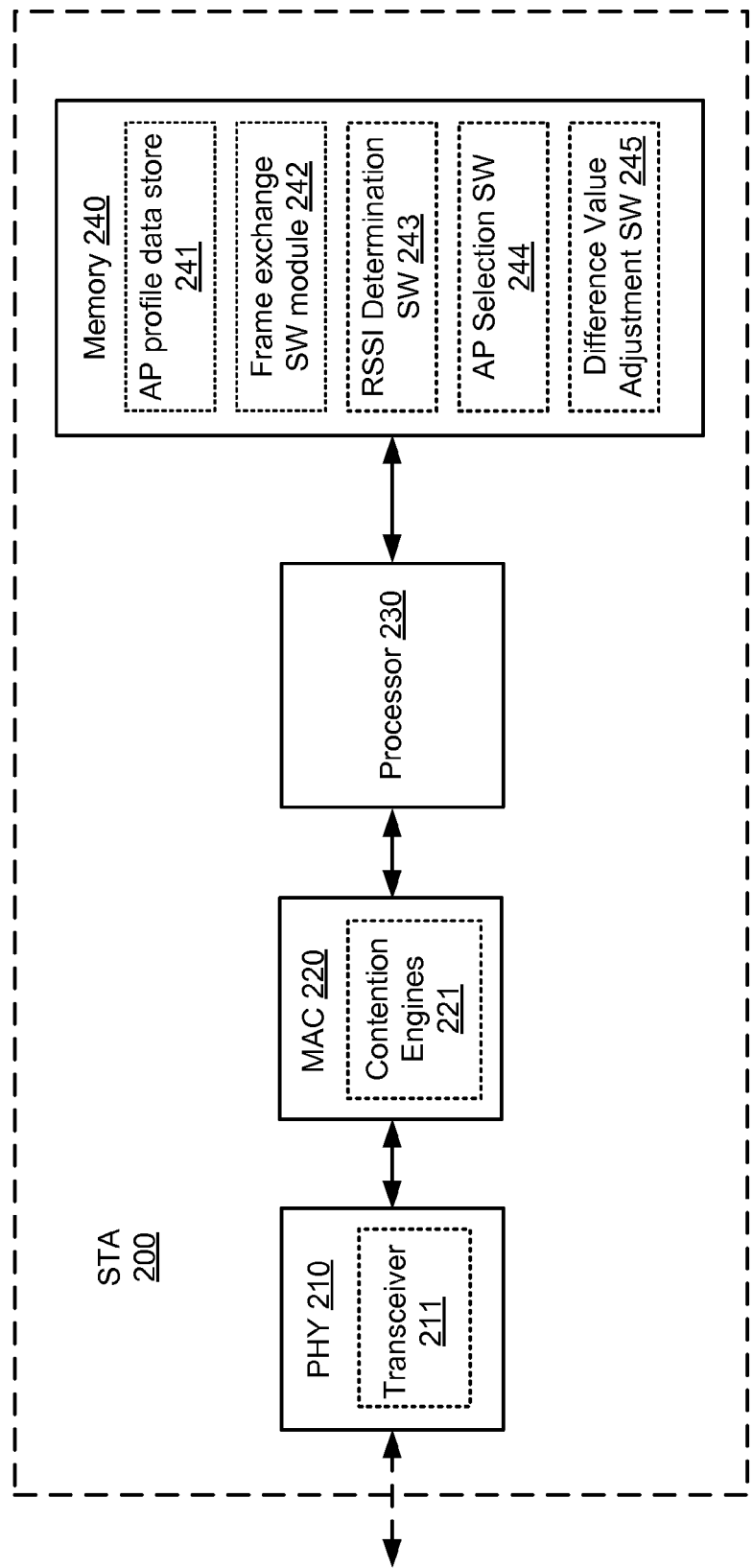
FIG. 2 shows a block diagram of a wireless station (STA) in accordance with some embodiments.

FIG. 2 shows a STA 200 that is one embodiment of at least one of the stations STA1-STA4 of FIG. 1. The STA 200 may include a PHY device 210 including at least a WLAN transceiver 211, a MAC 220 including a number of contention engines 221, a processor 230, and a memory 240. The transceiver 211 may be used to transmit signals to and receive signals from AP 110 (see also FIG. 1), and may be used to scan the surrounding environment to detect and identify nearby access points (e.g., access points within range of STA 200). For purposes of discussion herein, MAC 220 is shown in FIG. 2 as being coupled between PHY device 210 and processor 230. For actual embodiments, PHY device 210, MAC 220, processor 230, and/or memory 240 may be connected together using one or more buses (not shown for simplicity).

The contention engines 221 may contend for access to the shared wireless medium, and may also store packets for transmission over the shared wireless medium. The STA 200 may include one or more contention engines 221 for each of a plurality of different access categories. For other embodiments, the contention engines 221 may be separate from MAC 220. For still other embodiments, the contention engines 221 may be implemented as one or more software modules (e.g., stored in memory 240 or stored in memory provided within MAC 220) containing instructions that, when executed by processor 230, perform the functions of contention engines 221.

Memory 240 may include an AP profile data store 241 that stores profile information for a plurality of APs. The profile information for a particular AP may include information including, for example, the AP's SSID, channel information, RSSI values, supported data rates, connection history with STA 200, a trustworthiness value of the AP (e.g., indicating a level of confidence about the AP's location, etc.), and any other suitable information pertaining to or describing the operation of the AP.

Memory 240 may also include a non-transitory computer-readable medium (e.g., one or more nonvolatile memory elements, such as EPROM, EEPROM, Flash memory, a hard drive, and so on) that can store the following software modules:

- a frame exchange software module 242 for facilitating the creation and exchange of frames (e.g., association requests, probe requests, data frames, acknowledgement (ACK) frames, management frames, action frames, control frames, and so on) between the STA 200 and other STAs and/or a number of APs (e.g., as described for the operations of FIGS. 5 and 6A-6C);
- an RSSI determination software module 243 for determining a number of RSSI values for each of a number of nearby APs and/or to determine, for each of the nearby APs, an instantaneous RSSI value and/or an average RSSI value for a selected time period (e.g., as described for the operations of FIGS. 5 and 6A-6C);
- an AP selection software module 244 for selecting one of a number of nearby APs with which the STA is to associate or to switch its association (e.g., as described for the operations of FIGS. 5 and 6A-6C); and
- an RSSI threshold value adjustment software module 245 for dynamically adjusting an RSSI threshold value based, at least in part, on a number of channels scanned during the current scanning operation, a number of RSSI values of an AP currently associated with the STA 200, the STA's connection history with APs, and/or on a user selection of a mode (e.g., as described for the operations of FIGS. 5 and 6A-6C).

Each software module includes instructions that, when executed by processor 230, cause STA 200 to perform the corresponding functions. The non-transitory computer-readable medium of memory 240 thus includes instructions for performing all or a portion of the STA-side operations of the methods of FIGS. 5 and 6A-6C.

Processor 230, which is shown in the example of FIG. 2 as coupled to PHY device 210 and transceiver 211, to MAC 220 and contention engines 221, and to memory 240, may be any suitable processor capable of executing scripts or instructions of one or more software programs stored in STA 200 (e.g., within memory 240). For example, processor 230 may execute frame exchange software module 242 to facilitate the creation and exchange of frames (e.g., association requests, probe requests, data frames, acknowledgement (ACK) frames, management frames, action frames, control frames, and so on) between the STA 200 and one or more APs, and may execute frame exchange software module 242 to facilitate the reception of frames (e.g., beacon frames, association responses, probe responses, data frames, acknowledgement (ACK) frames, management frames, action frames, control frames, and so on) from one or more APs (or other STAs).

Processor 230 may also execute RSSI determination software module 243 to determine a number of RSSI values for each of a number of nearby APs and/or to determine, for each of the nearby APs, an average RSSI value for a selected time period. For some embodiments, execution of the RSSI determination software module 243 may cause the STA to store the RSSI values and/or average RSSI values for one or more APs in the AP profile data store 241, and/or to provide the RSSI values and/or average RSSI values for one or more APs to the AP selection software module 244 and/or to the difference value adjustment software module 245.

Processor 230 may also execute AP selection software module 244 to select one of a number of nearby APs with which the STA is to associate or to switch its association. For some embodiments, the AP selection software module 244 may compare first RSSI values for a first AP currently associated with the STA 200 with second RSSI values for at least a second AP not currently associated with the STA 200 to determine whether to switch association from the first AP to the at least one second AP. More specifically, for at least one embodiment, the AP selection software module 244 may switch association from the first AP and to the at least one second AP when the second RSSI values are greater than the first RSSI values by more than the RSSI threshold value, and may maintain the STA's association with the first AP when the second RSSI values are not greater than the first RSSI values by more than the RSSI threshold value. For at least another embodiment, the AP selection software module 244 may switch association from the first AP and to the at least one second AP when an average of the second RSSI values is greater than an average of the first RSSI values by more than the RSSI threshold value, and may maintain the STA's association with the first AP when the average of the second RSSI values is not greater than the average of the first RSSI values by more than the RSSI threshold value.

Processor 230 may also execute the RSSI threshold value adjustment software module 245 to dynamically adjust the RSSI threshold value based, at least in part, on a number of channels scanned during the current scanning operation, a number of RSSI values of an AP currently associated with the STA 200, a connection history with the AP, and/or on a user selection of a mode. More specifically, for at least one embodiment, the difference value adjustment software module 245 may increase the RSSI difference value when a moving average of the first RSSI values indicates that the first RSSI values are increasing over time, and may decrease the RSSI difference value when the moving average of the first RSSI values indicates that the first RSSI values are decreasing over time. For at least another embodiment, the difference value adjustment software module 245 may increase the RSSI difference value when the STA has been associated with the first AP for more than a predetermined time period, and may decrease the RSSI difference value when the STA has not been associated with the first AP for more than the predetermined time period. For at least another embodiment, difference value adjustment software module 245 may set the RSSI difference value to a relatively high value when the user selects is a first mode, and may set the RSSI difference value to a relatively low value when the user selects is a second mode.

As mentioned above, when a STA seeks to join a wireless network, the STA may have a choice between multiple wireless networks and/or between multiple APs that form an extended BSS. Thus, the STA may periodically scan its surroundings to find and/or determine the most suitable AP with which to associate (and therefore through which AP the STA may communicate with other devices and/or networks). More specifically, when STA 200 wants to access a WLAN (e.g., after power-up, upon re-entering an active mode, or when moving to a new area), the STA 200 may search for nearby APs by performing scanning operations. The IEEE 802.11 standards define both passive and active scanning operations.

In passive scanning, the STA 200 may scan individual channels for beacon frames that are periodically transmitted by nearby APs. The beacon frame includes the AP's SSID, supported data rates, synchronization information, and so on. When the STA 200 receives a beacon frame, the STA 200 may record information associated with the beacon frame (e.g., corresponding power levels and RSSI values) and thereafter use this information to select with which AP to associate.

In active scanning, the STA 200 tries to locate nearby APs, and initiates the scanning process by broadcasting probe request frames. This allows the STA 200 to receive immediate responses from APs (e.g., without waiting for transmission of beacon frames). The probe request frames may include an SSID, may include a null SSID, or may include a destination address of a specific AP. When the probe request frame includes an SSID, all APs with a matching SSID that receive the probe request frame respond by transmitting a probe response frame. When the probe request frame includes a null SSID, all APs that receive the probe request frame respond by transmitting a probe response frame. When the probe request frame includes a destination address of a specific AP, only the AP indicated by the destination address transmits a probe response that will be "heard" by the STA 200.

After the STA 200 is authenticated with a selected AP, STA 200 associates with the selected AP prior to exchanging data with the selected AP. The association process involves the exchange of information about capabilities of the STA 200 and the AP, and synchronizes the STA 200 with the selected AP. The STA 200 may initiate the association process by sending an association request frame to the selected AP. The selected AP responds by sending an association response frame containing an association ID (AID) along with other information regarding the AP.

When the STA 200 moves (e.g., "roams") within the range of a wireless network or moves between wireless networks, the STA 200 may improve throughput by associating with another AP that offers better performance (even though the STA 200 may still be within wireless range of the currently associated AP). For example, referring to the example wireless network 300 of FIG. 3, the STA 200 is currently associated with access point AP1 but is also within wireless range of non-associated access points AP2-AP3. Thus, although STA 200 is still within wireless range of AP1, AP2 and/or AP3 may offer better performance (e.g., higher throughput) than AP1. The STA 200 may perform connected or "roaming" scanning operations to determine a number of RSSI values of the each of the access points AP1-AP3, and then select the AP having the highest RSSI value as the "best" AP with which to associate. For some embodiments, the RSSI values may be derived from beacon frames received from the access points AP1-AP3. For purposes of discussion herein, AP1 may broadcast beacon frames having a first RSSI value denoted as $RSSI_1$, AP2 may broadcast beacon frames having a second RSSI value denoted as $RSSI_2$, and AP3 may broadcast beacon frames having a third RSSI value denoted as $RSSI_3$.

However, selecting the AP having the highest instantaneous RSSI value may not always result in the best performance. For example, if the STA 200 is moving in a direction between AP1 and AP2 such that, for a selected period of time, the number of times that $RSSI_2$ is greater than $RSSI_1$ is relatively small (e.g., compared with the number of times that $RSSI_1$ is greater than $RSSI_2$), then switching association between AP1 and AP2 based solely on which AP has the greater RSSI value at any given instant in time may result in the STA 200 frequently "bouncing" or "ping-ponging" between AP1 and AP2. More specifically, frequent "bouncing" or "ping-ponging" between AP1 and AP2 may reduce throughput due to the drain time and/or medium occupancy associated with dissociating and associating (or re-associating) with multiple APs. In addition, switching association between AP1 and AP2 based solely on which AP has the greater RSSI value at any given instant may not consider temporary reductions in an AP's RSSI values (e.g., resulting from multi-path effects, off-channel scanning operations, and the like) that may not be indicative of the AP's sustained signal strength.

Therefore, in accordance with some embodiments, the STA 200 may determine whether to switch its association from a first AP to a second AP based on whether the RSSI values of the first AP are greater than the RSSI values of the second AP by more than a difference value. For at least one embodiment, the STA 200 may determine whether to switch its association from the first AP to the second AP based on whether an average of the RSSI values of the first AP is greater than an average of the RSSI values of the second AP by more than the difference value. Using the difference value to determine whether to switch the STA's association between APs, as described herein, may prevent AP ping-ponging and provide other performance benefits, as described in more detail below. For purposes of discussion herein, the AP with which the STA is currently associated may be referred to as the "associated" AP, and any nearby APs that the STA is not currently associated with may be referred to as the "candidate" APs. Thus, for the example of FIG. 3, AP1 may be referred to as the associated AP, and AP2-AP3 may be referred to as candidate APs.

Figure 3:
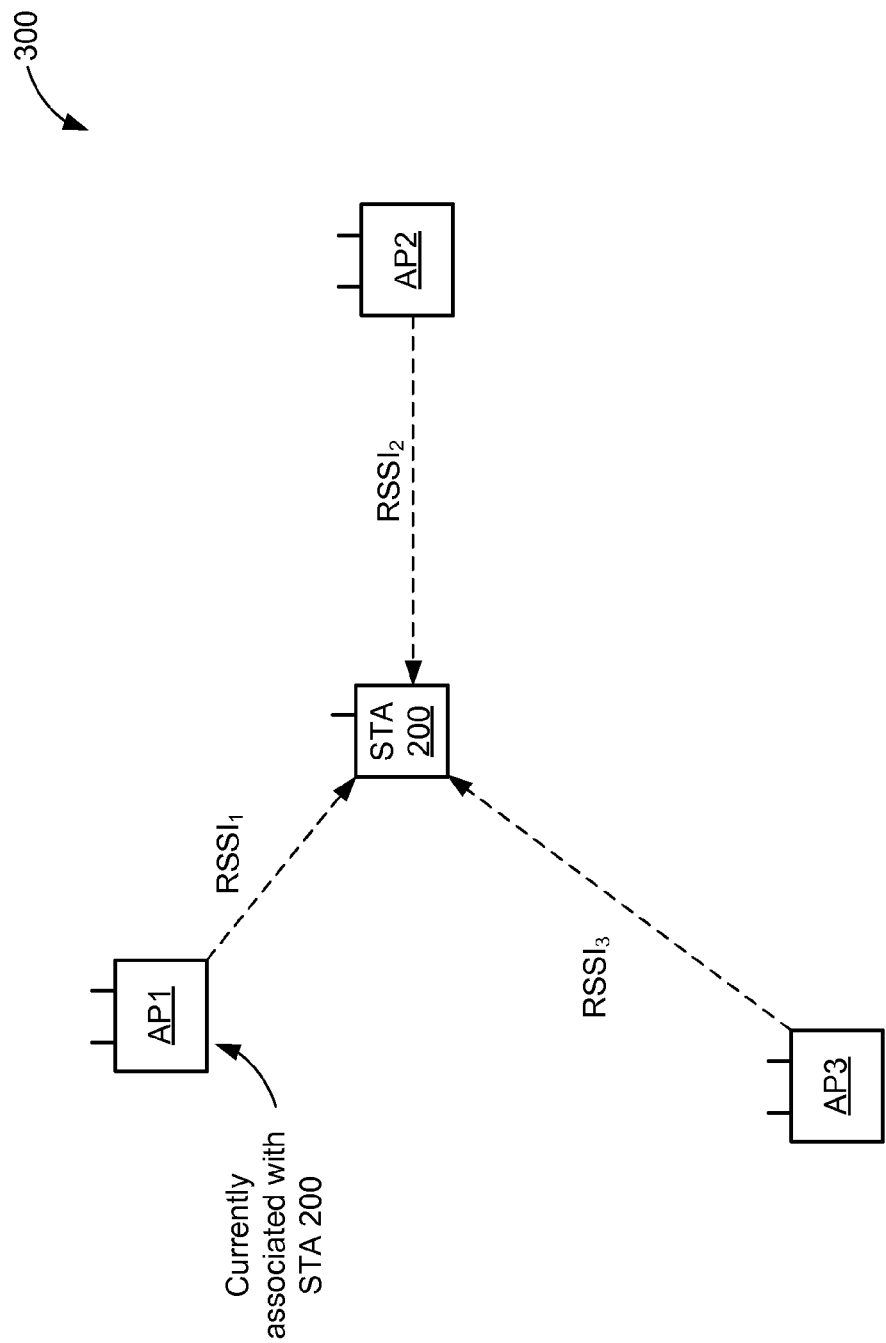
FIG. 3 shows a block diagram of an example wireless network in which the STA is receiving signals from three APs in accordance with some embodiments.
Figure 4A:
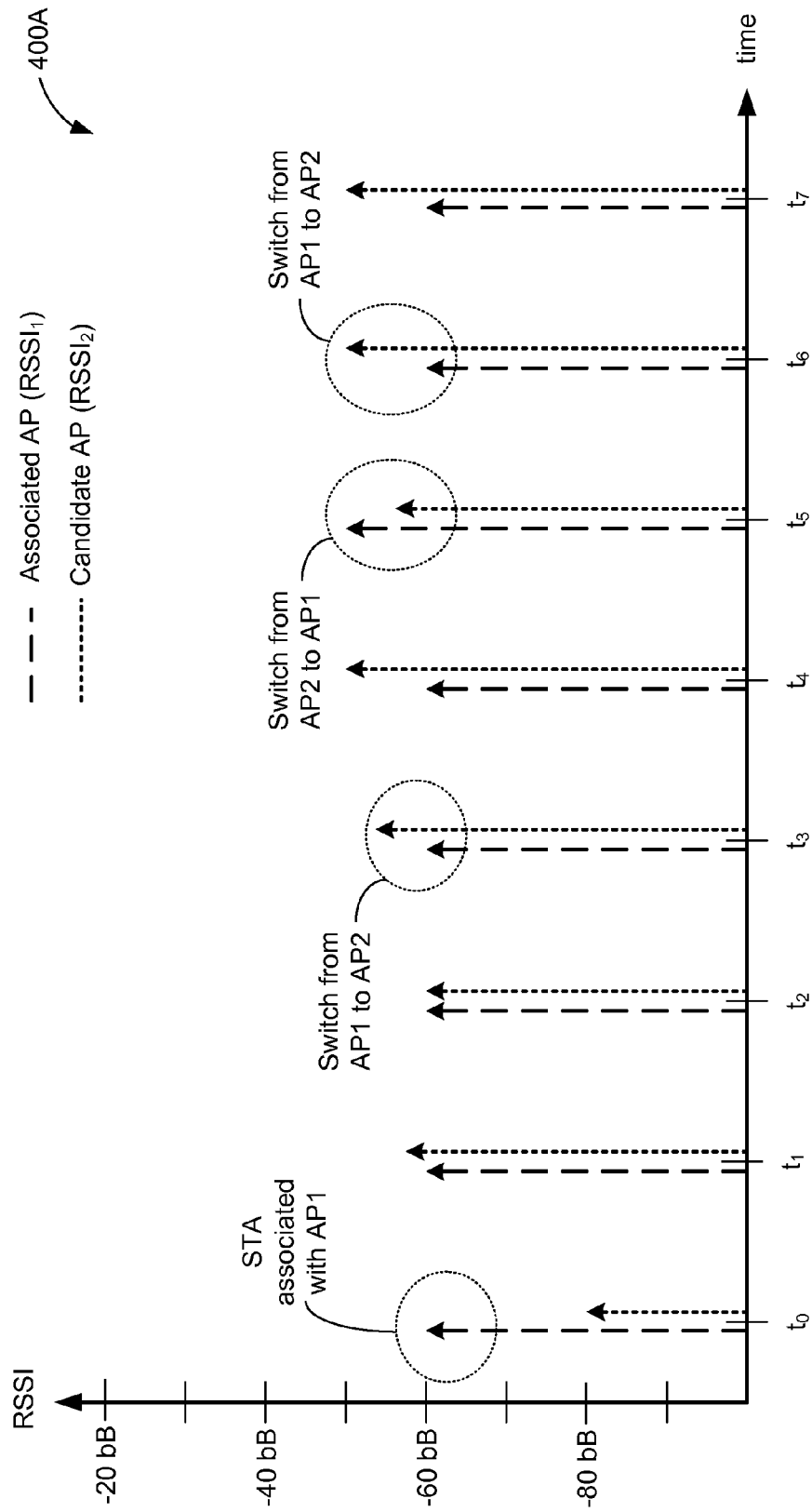
FIG. 4A depicts RSSI values of two of the APs of FIG. 3 over a period of time and an association switching operation in accordance with some embodiments.

FIG. 4A is sequence diagram 400A that depicts STA 200 selectively switching its associated between an associated AP and a candidate AP based, at least in part, on whether an RSSI value of the candidate AP is greater than the RSSI value of the associated AP by more than the difference value. For the example of FIG. 4A, the STA 200 is initially associated with AP1, and may also receive signals from at least one candidate AP (e.g., AP2). More specifically, FIG. 4A depicts example first RSSI values ($RSSI_1$) of the associated access point AP1 and example second RSSI values ($RSSI_2$) of the candidate access point AP2 of FIG. 3 over a duration of time. The values of $RSSI_1$ and $RSSI_2$ depicted in FIG. 4A may vary over time, for example, because of movement of the STA 200 relative to the locations of AP1 and/or AP2. For the example switching operation between access points described below with respect to FIG. 4A, the difference value is set to 5 dB (although the difference value may be dynamically adjusted, as described in more detail below). Thus, for the example depicted in FIG. 4A, the criteria with which STA 200 may switch its association from the associated AP to the candidate AP may be expressed as $RSSI_{candidateAP} > RSSI_{associatedAP} + RSSI_{difference}$, where $RSSI_{candidateAP}$ may be a value of $RSSI_1$ at a given time, $RSSI_{associatedAP}$ may be a value of $RSSI_2$ at the given time, and $RSSI_{difference}$ is the difference value.

At time $t_0$, AP1 has an $RSSI_1 = -60$ dB, and AP2 has an $RSSI_2 = -80$ dB. Thus, because $RSSI_2$ is not greater than $RSSI_1 + RSSI_{difference}$, the STA 200 maintains its current association with AP1.

At time $t_1$, AP1 has an $RSSI_1 = -60$ dB, and AP2 has an $RSSI_2 = -58$ dB. Thus, because $RSSI_2$ is not greater than $RSSI_1 + RSSI_{difference}$, the STA 200 maintains its current association with AP1. Note that although $RSSI_2 > RSSI_1$ at time $t_1$, the STA 200 does not switch its association from AP1 to AP2 at time $t_1$ because $RSSI_2$ does not exceed $RSSI_1$ by the difference value (e.g., $RSSI_{difference} = 5$ dB). This is in contrast to conventional techniques that would switch the STA's association from AP1 to AP2 at time $t_1$ because $RSSI_2 > RSSI_1$.

At time $t_2$, AP1 has an $RSSI_1 = -60$ dB, and AP2 has an $RSSI_2 = -60$ dB. Thus, because $RSSI_2$ is not greater than $RSSI_1 + RSSI_{difference}$, the STA 200 maintains its current association with AP1.

At time $t_3$, AP1 has an $RSSI_1 = -60$ dB, and AP2 has an $RSSI_2 = -54$ dB. Thus, because $RSSI_2$ is now greater than $RSSI_1 + RSSI_{difference}$, the STA 200 switches its association from AP1 to AP2, for example, by dissociating from AP1 and associating with AP2.

At time $t_4$, AP1 has an $RSSI_1 = -60$ dB, and AP2 has an $RSSI_2 = -50$ dB. Thus, because $RSSI_1$ is not greater than $RSSI_2 + RSSI_{difference}$, the STA 200 maintains its current association with AP2 at time $t_4$.

At time $t_5$, AP1 has an $RSSI_1 = -50$ dB, and AP2 has an $RSSI_2 = -56$ dB. Thus, because $RSSI_1$ is now greater than $RSSI_2 + RSSI_{difference}$, the STA 200 switches its association from AP2 to AP1, for example, by dissociating from AP2 and associating with AP1.

At time $t_6$, AP1 has an $RSSI_1 = -60$ dB, and AP2 has an $RSSI_2 = -50$ dB. Thus, because $RSSI_2$ is now greater than $RSSI_1 + RSSI_{difference}$, the STA switches its association from AP1 to AP2, for example, by dissociating from AP1 and associating with AP2.

At time $t_7$, AP1 has an $RSSI_1 = -60$ dB, and AP2 has an $RSSI_2 = -50$ dB. Thus, because $RSSI_1$ is not greater than $RSSI_2 + RSSI_{difference}$, the STA 200 maintains its current association with AP2.

In this manner, the STA 200 may switch its association between AP1 and AP2 when $RSSI_{candidateAP} > RSSI_{associatedAP} + RSSI_{difference}$, which may allow the STA 200 to switch its association less frequently than conventional techniques that would switch association when $RSSI_{candidateAP} > RSSI_{associatedAP}$. For example, while such conventional techniques would switch the STA's association from AP1 to AP2 at time $t_1$, the present embodiments do not switch the STA's association from AP1 to AP2 at time $t_1$ because the difference between $RSSI_2$ and $RSSI_1$ at time $t_1$ is not greater than $RSSI_{difference}=5$ dB.

For other embodiments, the STA's association may be switched between APs when an average value of $RSSI_{candidateAP}$ is greater than an average value of $RSSI_{associatedAP}+RSSI_{difference}$. The average values of $RSSI_{candidateAP}$ and $RSSI_{associatedAP}$ may be determined for a selected time period. As described in more detail below, determining whether to switch the STA's association based on average RSSI values (e.g., rather than on instantaneous RSSI values) may further improve performance by reducing the occurrences of AP ping-ponging.

Figure 4B:
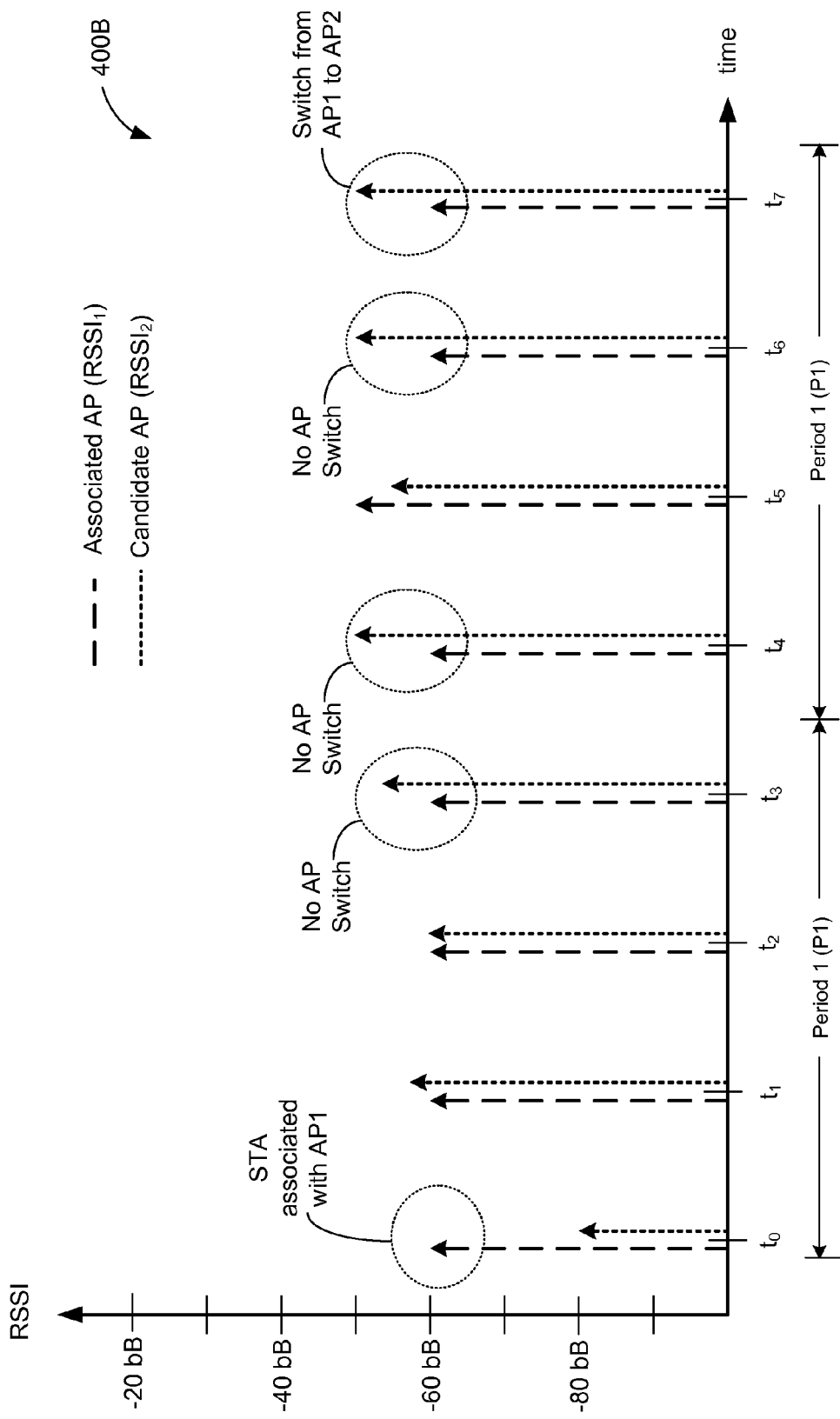
FIG. 4B depicts RSSI values of two of the APs of FIG. 3 over a period of time and an association switching operation in accordance with other embodiments.

FIG. 4B is sequence diagram 400B that depicts STA 200 selectively switching its association from AP1 to AP2 based, at least in part, on whether an average value of $RSSI_2$ is greater than an average value of $RSSI_1$ by more than the difference value. For the example of FIG. 4B, the STA 200 is initially associated with AP1, and may also receive signals from at least one candidate AP (e.g., AP2). More specifically, FIG. 4B depicts the example values of $RSSI_1$ for AP1 and the example values of $RSSI_2$ for AP2 of FIG. 4A relative to two selected time periods P1 and P2. The first selected time period P1 includes RSSI values determined at times $t_0$-$t_3$, and the second selected time period P2 includes RSSI values determined at times $t_4$-$t_7$.

Further, for the example AP association switching operation described below with respect to FIG. 4B, the difference value is set to 5 dB (although the difference value may be dynamically adjusted, as described in more detail below). Thus, for the example below, the criteria with which STA 200 may switch its association from an associated AP to a candidate AP may be expressed as $RSSI_{candidateAP,average}>RSSI_{associated\ AP,average}+RSSI_{difference}$, where $RSSI_{candidateAP,average}$ is an average of multiple values of $RSSI_{candidateAP}$ for a selected time period, $RSSI_{associatedAP,average}$ is an average of multiple values of $RSSI_{associated\ AP}$ for the selected time period, and $RSSI_{difference}$ is the difference value.

At time $t_0$, AP1 has an $RSSI_1=-60$ dB, and AP2 has an $RSSI_2=-80$ dB. At time $t_1$, AP1 has an $RSSI_1=-60$ dB, and AP2 has an $RSSI_2=-58$ dB. At time $t_2$, AP1 has an $RSSI_1=-60$ dB, and AP2 has an $RSSI_2=-60$ dB.

At time $t_3$, AP1 has an $RSSI_1=-60$ dB, and AP2 has an $RSSI_2=-54$ dB. Just after time $t_3$, the STA 200 determines whether $RSSI_{2,average}$ is greater than $RSSI_{1,average}$ by more than the difference value, for the first selected time period P1. For the first selected time period P1, the value of $RSSI_{2,average}$ is equal to $-60$ dB, and the value of $RSSI_{1,average}$ is equal to $-63$ dB. Thus, for the first selected time period P1, the value of $RSSI_{2,average}$ is greater than the value of $RSSI_{1,average}$ by 3 dB, which is less than the difference value of 5 dB. Accordingly, the STA 200 maintains its current association with AP1. Thus, although at time $t_3$ the instantaneous value of $RSSI_2$ is greater than the instantaneous value of $RSSI_1$ by more than the difference value, the STA 200 does not switch its association from AP1 to AP2 at time $t_3$ because the average value of $RSSI_2$ is not greater than the average value of $RSSI_1$ by more than the difference amount for the first selected time period P1. This is in contrast to the example depicted in FIG. 4A in which the STA 200 switches its association from AP1 to AP2 at time $t_3$.

At time $t_4$, AP1 has an $RSSI_1=-60$ dB, and AP2 has an $RSSI_2=-50$ dB. Thus, even though $RSSI_2>RSSI_1+RSSI_{difference}$, the STA 200 maintains its current association with AP2 at time $t_4$ because $RSSI_{2,average}$ is not greater than $RSSI_{1,average}$ by more than $RSSI_{difference}$ for the second selected time period P2.

At time $t_5$, AP1 has an $RSSI_1=-50$ dB, and AP2 has an $RSSI_2=-56$ dB.

At time $t_6$, AP1 has an $RSSI_1=-60$ dB, and AP2 has an $RSSI_2=-50$ dB. Thus, even though $RSSI_2>RSSI_1+RSSI_{difference}$, the STA 200 maintains its current association with AP2 at time $t_6$ because $RSSI_{2,average}$ is not greater than $RSSI_{1,average}$ by more than $RSSI_{difference}$ for the second selected time period P2.

At time $t_7$, AP1 has an $RSSI_1=-60$ dB, and AP2 has an $RSSI_2=-50$ dB. Just after time $t_7$, the STA 200 determines whether $RSSI_{2,average}$ is greater than $RSSI_{1,average}$ by more than the difference value, for the second selected time period P2. For the second selected time period P2, the value of $RSSI_{2,average}$ is $-51.5$ dB, and the value of $RSSI_{1,average}$ $-57.5$ dB. Thus, for the time period P2, $RSSI_{2,average}>RSSI_{1,average}30\ RSSI_{difference}$, and therefore the STA 200 may switch its association from AP1 to AP2 just after time $t_7$.

Accordingly, for the embodiment of FIG. 4B, the STA 200 switches association from AP1 to AP2 only once: just after time $t_7$ when the average of the $RSSI_2$ values is greater than the average of the $RSSI_1$ values by more than the difference value. In contrast, the embodiment of FIG. 4A switches the STA's association 3 times during a similar duration of time: a first switch from AP1 to AP2 at time $t_3$, a second switch from AP2 to AP1 at time $t_5$, and a third switch from AP1 to AP2 at time $t_6$. In this manner, the embodiment of FIG. 4B may reduce AP ping-ponging (as compared to the embodiment of FIG. 4A) by switching the STA's association between APs based on average RSSI values rather than on instantaneous RSSI values.

As mentioned above, the difference value ($RSSI_{difference}$) may be dynamically adjusted in accordance with the present embodiments. For some embodiments, the difference value may be dynamically adjusted based, at least in part, on the RSSI values of the currently associated AP. For one example, if a moving average of the RSSI values of the associated AP indicates that the associated AP's RSSI values are increasing over time, then the difference value may be increased (e.g., to reduce the likelihood that the STA switches its association to another AP); conversely, if the moving average of the RSSI values of the associated AP indicates that the associated AP's RSSI values are decreasing over time, then the difference value may be decreased (e.g., to increase the likelihood that the STA switches its association to another AP). For another example, if an instantaneous RSSI value of the associated AP is greater than a first threshold value (e.g., indicating that the AP signal strength is excellent), then the difference value may be increased (e.g., to reduce the likelihood that the STA switches its association to another AP); conversely, if the instantaneous RSSI value of the associated AP is less than a second threshold value (e.g., indicating that the AP signal strength is poor), then the difference value may be decreased (e.g., to increase the likelihood that the STA switches its association to another AP).

For other embodiments, the difference value may be dynamically adjusted based, at least in part, on the association history of the STA 200. For example, if STA 200 has been connected to the associated AP for more than a threshold time period and/or if the STA 200 connects to the associated AP more than a certain number of times per day/week/month/year (e.g., or other indications as to the popularity of the associated AP), then the difference value may be increased (e.g., to reduce the likelihood that the STA switches its association to another AP); conversely, if STA 200 has not been connected to the associated AP for more than the threshold time period and/or if the STA 200 connects to the associated AP less than a certain number of times per day/week/month/year (e.g., or other indications as to the popularity of the associated AP), then the difference value may be decreased (e.g., to increase the likelihood that the STA switches its association to another AP).

For still other embodiments, the difference value may be dynamically adjusted based, at least in part, on a user selection of an operating mode. For example, the user may select between a first mode and a second mode, where selection of the first mode sets the difference value to a relatively high value (e.g., to reduce the likelihood that the STA switches its association to another AP), and selection of the second mode sets the difference value to a relatively low value (e.g., to increase the likelihood that the STA switches its association to another AP).

Figure 5:
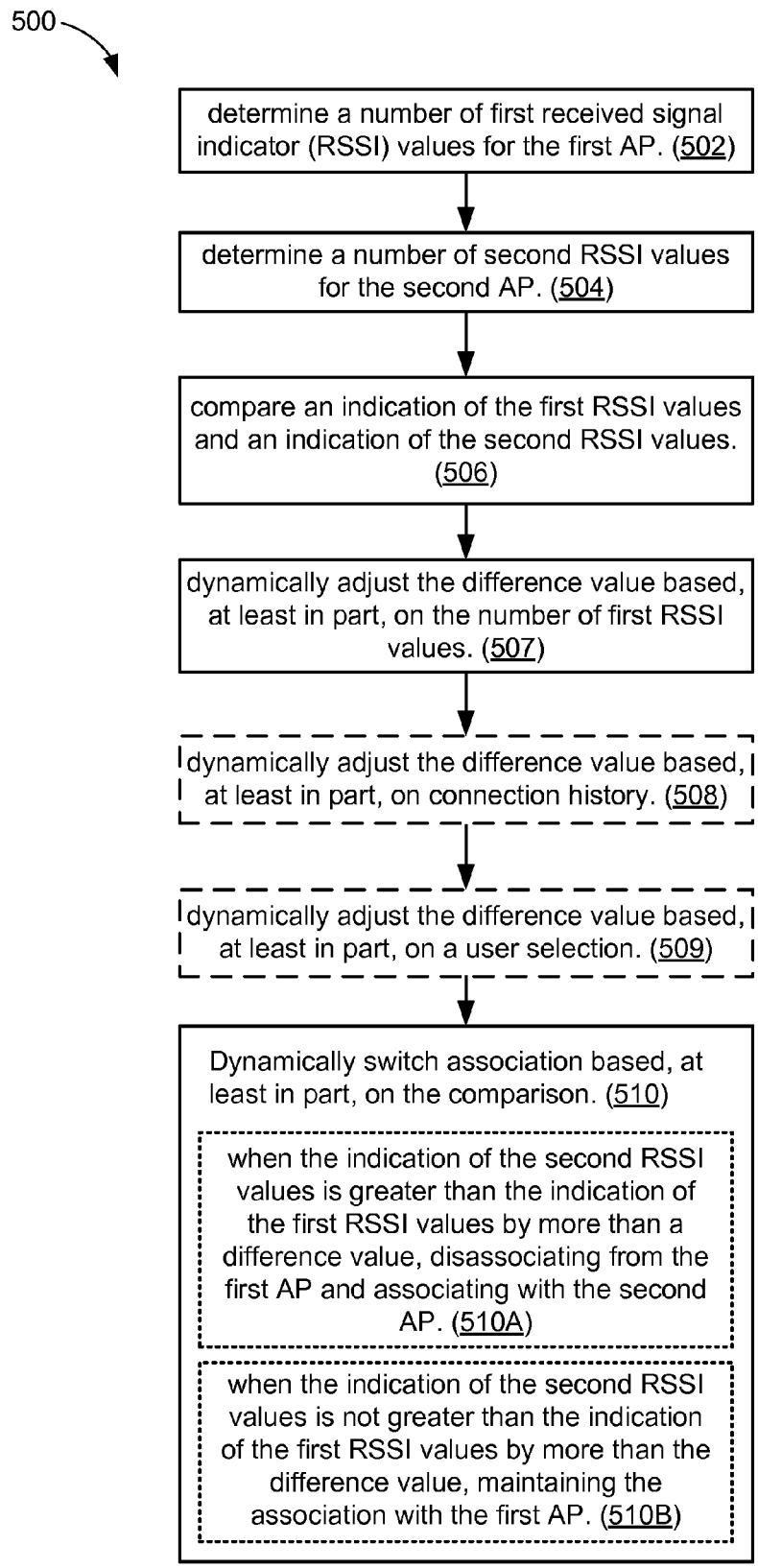
FIG. 5 shows an illustrative flow chart depicting an example operation for selectively switching a STA's association from a first AP to a second AP, in accordance with some embodiments.

An example operation for selectively switching the association of STA 200 from a first AP (e.g., the associated AP) to a second AP (e.g., the candidate AP) is described below with respect to the illustrative flow chart 500 of FIG. 5. Referring also to FIGS. 3 and 4A-4B, the STA 200 may determine a number of first RSSI values ($RSSI_1$) for the first AP (502), and determine a number of second RSSI values ($RSSI_2$) for the second AP (504). The $RSSI_1$ values and the $RSSI_2$ values may be determined by STA 200 and/or provided to STA 200 in any suitable manner. For at least one embodiment, the $RSSI_1$ and $RSSI_2$ values may be determined by STA 200 during scanning operations.

Then, the STA 200 may compare an indication of the $RSSI_1$ values and an indication of the $RSSI_2$ values (506). For some embodiments, the indication of the $RSSI_1$ values may be an instantaneous value of $RSSI_1$, and the indication of the $RSSI_2$ values may be an instantaneous value of $RSSI_2$. For other embodiments, the indication of the $RSSI_1$ values may be an average of the $RSSI_1$ values, and the indication of the $RSSI_2$ values may be an average of the $RSSI_2$ values.

For at least a first embodiment, the STA 200 may dynamically adjust the difference value based, at least in part, on the number of first RSSI values for the associated AP (507). More specifically, referring to the example flow chart 610 of FIG. 6A, the STA 200 may increase the difference value when a moving average of the first RSSI values indicates that the first RSSI values are increasing over time (611), and may decrease the difference value when the moving average of the first RSSI values indicates that the first RSSI values are decreasing over time (612).

For at least a second embodiment, the STA 200 may dynamically adjust the difference value based, at least in part, on the connection history between the STA 200 and the associated AP (508). More specifically, referring to the example flow chart 620 of FIG. 6B, the STA 200 may increase the difference value when the STA has been associated with the first AP for more than a predetermined time period (621), and may decrease the difference value when the STA has been associated with the first AP for less than or equal to the predetermined time period (622).

For at least a third embodiment, the STA 200 may dynamically adjust the difference value based, at least in part, on a user selection of an operating mode (509). More specifically, referring to the example flow chart 630 of FIG. 6C, the STA 200 may set the difference value to a relatively high value when the user selects a first mode (631), and may set the difference value to a relatively low value when the user selects a second mode (632).

Referring again to FIG. 5, the STA 200 may then dynamically switch its association from the first AP to the second AP based, at least in part, on the results of the comparison operation (510). More specifically, when the indication of the $RSSI_2$ values is greater than the indication of the $RSSI_1$ values by more than the difference value, the STA may switch its association from the first AP to the second AP, for example, by disassociating from the first AP and associating with the second AP (510A). Conversely, when the indication of the $RSSI_2$ values is not greater than the indication of the $RSSI_1$ values by more than the difference value, the STA 200 may maintain its current association with the first AP (510B).

In the foregoing specification, embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for selectively switching a mobile station's association from a first access point (AP) to a second AP, the method performed by the mobile station (STA) and comprising:
    determining a number of first received signal strength indicator (RSSI) values for the first AP;
    determining a number of second RSSI values for the second AP;
    comparing an indication of the first RSSI values and an indication of the second RSSI values;
    if the indication of the second RSSI values is greater than the indication of the first RSSI values by more than a difference value, disassociating from the first AP and associating with the second AP;
    if the indication of the second RSSI values is not greater than the indication of the first RSSI values by more than the difference value, maintaining the association with the first AP; and
    dynamically adjusting the difference value based, at least in part, on the number of first RSSI values by:
    increasing the difference value if a moving average of the first RSSI values indicates that the first RSSI values are increasing over time;
    decreasing the difference value if the moving average of the first RSSI values indicates that the first RSSI values are decreasing over time;
    increasing the difference value if the STA has been associated with the first AP for more than a predetermined time period; and
    decreasing the difference value if the STA has not been associated with the first AP for more than the predetermined time period.

2. The method of claim 1, wherein the indication of the first RSSI values comprises an average of the first RSSI values, and the indication of the second RSSI values comprises an average of the second RSSI values.

3. The method of claim 1, wherein the difference value is based, at least in part, on a user selection of a first mode or a second mode.

4. The method of claim 3, wherein:
    if the user selection is the first mode, increasing the difference value to reduce a likelihood of the STA disassociating from the first AP and associating with the second AP; and if the user selection is the second mode, decreasing the difference value to increase the likelihood of the STA disassociating from the first AP and associating with the second AP.

5. A mobile station (STA) that selectively switches its association from a first access point (AP) to a second AP, the STA comprising:
   means for determining a number of first received signal indicator (RSSI) values for the first AP;
   means for determining a number of second RSSI values for the second AP;
   means for comparing an indication of the first RSSI values and an indication of the second RSSI values;
   means for disassociating from the first AP and associating with the second AP if the indication of the second RSSI values is greater than the indication of the first RSSI values by more than a difference value;
   means for maintaining the association with the first AP if the indication of the second RSSI values is not greater than the indication of the first RSSI values by more than the difference value; and
   means for dynamically adjusting the difference value based, at least in part, on the number of first RSSI values, means for dynamically adjusting is to:
   increase the difference value if a moving average of the first RSSI values indicates that the first RSSI values are increasing over time;
   decrease the difference value if the moving average of the first RSSI values indicates that the first RSSI values are decreasing over time;
   increase the difference value if the STA has been associated with the first AP for more than a predetermined time period; and
   decrease the difference value if the STA has not been associated with the first AP for more than the predetermined time period.

6. The mobile station of claim 5, wherein the indication of the first RSSI values comprises an average of the first RSSI values, and the indication of the second RSSI values comprises an average of the second RSSI values.

7. The mobile station of claim 5, wherein the difference value is based, at least in part, on a user selection of a first mode or a second mode.

8. The mobile station of claim 7, further comprising:
   means for increasing the difference value to reduce a likelihood of the STA disassociating from the first AP and associating with the second AP if the user selection is the first mode; and
   means for decreasing the difference value to increase the likelihood of the STA disassociating from the first AP and associating with the second AP if the user selection is the second mode.

9. A mobile station (STA) that selectively switches its association from a first access point (AP) to a second AP, the STA comprising:
   a processor; and
   a memory storing instructions that, when executed by the processor, cause the STA to perform operations comprising:
   determining a number of first received signal indicator (RSSI) values for the first AP;
   determining a number of second RSSI values for the second AP;
   comparing an indication of the first RSSI values and an indication of the second RSSI values;
   disassociating from the first AP and associating with the second AP if the indication of the second RSSI values is greater than the indication of the first RSSI values by more than a difference value;
   maintaining the association with the first AP if the indication of the second RSSI values is not greater than the indication of the first RSSI values by more than the difference value; and
   dynamically adjust the difference value based, at least in part, on the number of first RSSI values, wherein execution of the instructions to dynamically adjust the difference value causes the STA to perform operations further comprising:
   increasing the difference value if a moving average of the first RSSI values indicates that the first RSSI values are increasing over time;
   decreasing the difference value if the moving average of the first RSSI values indicates that the first RSSI values are decreasing over time;
   increase the difference value if the STA has been associated with the first AP for more than a predetermined time period; and
   decrease the difference value if the STA has not been associated with the first AP for more than the predetermined time period.

10. The mobile station of claim 9, wherein the indication of the first RSSI values comprises an average of the first RSSI values, and the indication of the second RSSI values comprises an average of the second RSSI values.

11. The mobile station of claim 9, wherein the difference value is based, at least in part, on a user selection of a first mode or a second mode.

12. The mobile station of claim 11, wherein execution of the instructions causes the STA to perform operations further comprising:
   increasing the difference value to reduce a likelihood of the STA disassociating from the first AP and associating with the second AP if the user selection is the first mode; and
   decreasing the difference value to increase the likelihood of the STA disassociating from the first AP and associating with the second AP if the user selection is the second mode.

13. A non-transitory computer-readable storage medium storing one or more programs containing instructions that, when executed by one or more processors of a mobile station (STA), cause the STA to selectively switch its association from a first access point (AP) to a second AP by performing operations comprising:
   determining a number of first received signal indicator (RSSI) values for the first AP;
   determining a number of second RSSI values for the second AP;
   comparing an indication of the first RSSI values and an indication of the second RSSI values;
   disassociating from the first AP and associating with the second AP if the indication of the second RSSI values is greater than the indication of the first RSSI values by more than a difference value;
   maintaining the association with the first AP if the indication of the second RSSI values is not greater than the indication of the first RSSI values by more than the difference value; and
   dynamically adjusting the difference value based, at least in part, on the number of first RSSI values by:
   increasing the difference value if a moving average of the first RSSI values indicates that the first RSSI values are increasing over time;

decreasing the difference value if the moving average of the first RSSI values indicates that the first RSSI values are decreasing over time;

increasing the difference value if the STA has been associated with the first AP for more than a predetermined time period; and decreasing the difference value if the STA has not been associated with the first AP for more than the predetermined time period.

14. The non-transitory computer-readable storage medium of claim 13, wherein the indication of the first RSSI values comprises an average of the first RSSI values, and the indication of the second RSSI values comprises an average of the second RSSI values.

15. The non-transitory computer-readable storage medium of claim 13, wherein the difference value is based, at least in part, on a user selection of a first mode or a second mode.

16. The non-transitory computer-readable storage medium of claim 15, wherein execution of the instructions causes the STA to perform operations further comprising:

increasing the difference value to reduce a likelihood of the STA disassociating from the first AP and associating with the second AP if the user selection is the first mode; and decreasing the difference value to increase the likelihood of the STA disassociating from the first AP and associating with the second AP if the user selection is the second mode.

* * * * *